United States Patent

Kobayashi

[11] Patent Number: 5,128,929
[45] Date of Patent: Jul. 7, 1992

[54] TIME DIVISION SWITCHING SYSTEM CAPABLE OF BROAD BAND COMMUNICATIONS SERVICE

[75] Inventor: Tsuneo Kobayashi, Tokyo, Japan

[73] Assignee: NEC Corporation, Japan

[21] Appl. No.: 437,016

[22] Filed: Nov. 14, 1989

[30] Foreign Application Priority Data

Nov. 15, 1988 [JP] Japan .................. 63-289401

[51] Int. Cl.$^5$ .......................................... H04Q 11/00
[52] U.S. Cl. ..................... 370/58.1; 370/60; 370/94.1
[58] Field of Search ............. 370/60, 94.1, 58.1, 370/58.3, 68

[56] References Cited

U.S. PATENT DOCUMENTS

| | | | |
|---|---|---|---|
| 4,332,026 | 5/1982 | Alvarez, III et al. | 370/66 |
| 4,654,842 | 3/1987 | Coraluppi et al. | 370/58.1 |
| 4,661,946 | 4/1987 | Takahashi et al. | 370/58.1 |
| 4,704,716 | 11/1987 | Bowers et al. | 370/60 |
| 4,868,813 | 9/1989 | Suzuki | 370/56 |
| 4,885,738 | 12/1989 | Bowers et al. | 370/68 |

Primary Examiner—Douglas W. Olms
Assistant Examiner—Dang T. Ton
Attorney, Agent, or Firm—Laff, Whitesel, Conte & Saret

[57] ABSTRACT

Sometimes digital data become out of order as it passes through a time division switching system. This invention restores the proper order by transmitting sequence information with the digital data. At the receive end, the data is assembled in its proper and original order in buffer storage means responsive to the sequence information.

2 Claims, 8 Drawing Sheets

TIME DIVISION SWITCHING SYSTEM CAPABLE OF BROAD BAND COMMUNICATIONS SERVICE

BACKGROUND OF THE INVENTION

1. Field of the Invention

The present invention relates to a time division switching system for use in a network capable of simultaneously handling both telephone exchange service and non-telephone service including high speed and broad band communication service.

2. Description of the Prior Art

A time division switching system switches connections between two channels of two different time division multiplex communication paths.

Known time division switches utilize a memory switch and a control memory. Input signals on the channels of a number of input lines, for instance, N lines, are written into the memory switch. The signals are then read out in a prescribed sequence (which is different from the sequence of writing the input signals into this memory switch). The signals are then output into the channels on the N different output lines. This enables the N communication lines which are connected to the output side to be connected with the N communication lines connected on the input side. The line may be so interconnected in any desired combination, on a channel basis.

The control memory is used to supply read addresses for the memory switch. Read addresses for the N lines, i.e., N such addresses, are written into the control memory and read out in a prescribed sequence and supplied to the memory switch.

To change a connection between channels, the corresponding read address written into the control memory is altered.

A time frame is a complete round of actions to sequentially store all the signals for said N lines and to read these signals for the N lines in a prescribed sequence with the memory switch If the time length of this single frame is selected to be 125 microseconds and if signals for a single line (or a single channel) are eight-bit digital signals, 8 (bits) / 125 (microseconds)=64 kilo bits (Kb) per line are switched (for instance in a telephone exchange) each second. Such a switching process will be hereinafter referred to as "64 K b/s" (second) switching.

However, if data transmission is to be achieved through a data terminal, having a transmission speed with is higher than 64 K b/s, connected to a 64 K b/s switching system, a series of data will be split into two or more time slots within a frame and separately transmitted (two time slots are used if the bit rate is 64 K b/s×2=228 K b/s). Since these separate groups of data (multi-element data) have close relationships and continuity among one another within the same time frame, they have to be within the same frame when inputted or output by a time division switch. However, a conventional time division, switch cannot preserve the same sequence of signals on both the input side and the output side. Thus, high speed data switching cannot be achieved in such an instance unless some special arrangement is made.

The following description concerns, as an example, a case in which a multiplex-time-division communication path of 128 channels per frame is handled with a time division switch. FIG. 1 illustrates a typical three-stage time division switching system having a primary switch PSW (time division switch), a secondary switch SSW (space division switch) and a tertiary switch TSW (time division switch). In the time division switches constituting the primary and tertiary switches, eight-bit data of one of the 128 channels is allocated for each time side on the input slot, and is inserted into, any . desired time slot on the output side, to become the output signal.

As illustrated in FIG. 2(a), there are two mutually related data X1 (8 bits) and X2 (8 bits) (multi-element data), i.e., two data of 64 K b/s×2, belonging to a single frame in the input time slots "ITS's" No. 0 and No. 4, respectively. If the time division switch inserts these data X1 and X2 into unoccupied output time slots "OTS's" No. 0 and No. 6, respectively, to be output, these data X1 and X2 will be output in the same frame so that their relativity will be preserved. However, if OTS No. 0 and No. 1 are selected, as shown in FIG. 2(b), for outputting two 64 K b/s data X1 and X2, respectively, the data X2 cannot be written into the memory switch in time for it to be read out (insertion into OTS No. 1). Therefore, the data X2 in the preceding frame (a cycle before) will always be output into OTS No. 1. The sequence between the X1 and X2 cannot be preserved. The relativity between them cannot be maintained at the data terminal on the receiving side. If an algorithm of software is designed to select OTS's in the time division switch so as to always read out the data after their writing into the memory switch within the same frame, as shown in FIG. 2(a), the sequence and relativity will be preserved even in the switching is 64 K b/s×2. However, such software will invite increases in the time required for processing a selection of unoccupied time slot and in the block ratio, resulting in reduction of the processing capacity of the switching system.

Meanwhile, U.S. patent application Ser. No. 07/187,258 filed Apr. 28, 1988 by the same applicant, describes an example of double-buffered time division switching system in which two memory switches are used, one in the read mode while the other is in the write mode. A use of such a time division switch for switching 64 K b/s×n data, as referred to above, would make it possible to preserve the sequence and relativity among the data. However, since this system needs two memory switches in each time division switch, the entire system is expensive. Moreover, any existing network using conventional time division switches would require a replacement of all the time division switch or a conversion into a double-buffered structure. This would be too expensive and accordingly unadvantageous for a network whose volume of the multi-element data traffic is small.

SUMMARY OF THE INVENTION

An object of the present invention, therefore, is to provide a time division exchange system in which two or more mutually relevant data are present. These data are split from each other in a single frame on a time division communication path (i.e., 64 K b/s×n switching). This preserves the relativity between the data without reducing the processing capacity of the switching equipment even in a network using conventional switching equipment.

In order to achieve the above object, the present invention provides a time division switching system for switching K-bit (K is a positive integer) transmit data and L-bit (L≧2) control data.

On the sending side, the system has transmitting means for transmitting a sequence of information when the K-bit×P (2≦P≦Q) multi-element data constitute a sequence of data in a single frame which is be switched. The sequence information is for correcting the sequence of the multi-element data as part of the control data in synchronism with the multi-element data sent out frame by frame on a Q-multiplexed (Q is a positive integer) input highway of the time division switching equipment.

The receiving side has at least three buffer memories for receiving and storing the multi-element data from the Q-multiplexed output highway of the switching equipment. An accumulating means sequentially accumulates multi-element data in the at least three buffer memories in accordance with the sequence information which has been received. Sequence correcting means corrects the sequence of the multi-element data by outputting the contents of this buffer memory, when all of the multi-element data sent within the same frame on the sending side have been accumulated in one of the buffer memories.

BRIEF DESCRIPTION OF THE DRAWINGS

The above objects and features of the present invention will become more apparent from the detailed description hereunder when taken in conjunction with the accompanying drawings, in which:

FIGS. 6, 6A, 6B and 7 are diagrams illustrating the operation of the preferred embodiment of the invention.

In these drawings, the same reference numerals denote respectively the same constituent elements.

DESCRIPTION OF THE PREFERRED EMBODIMENT

Figure 3:
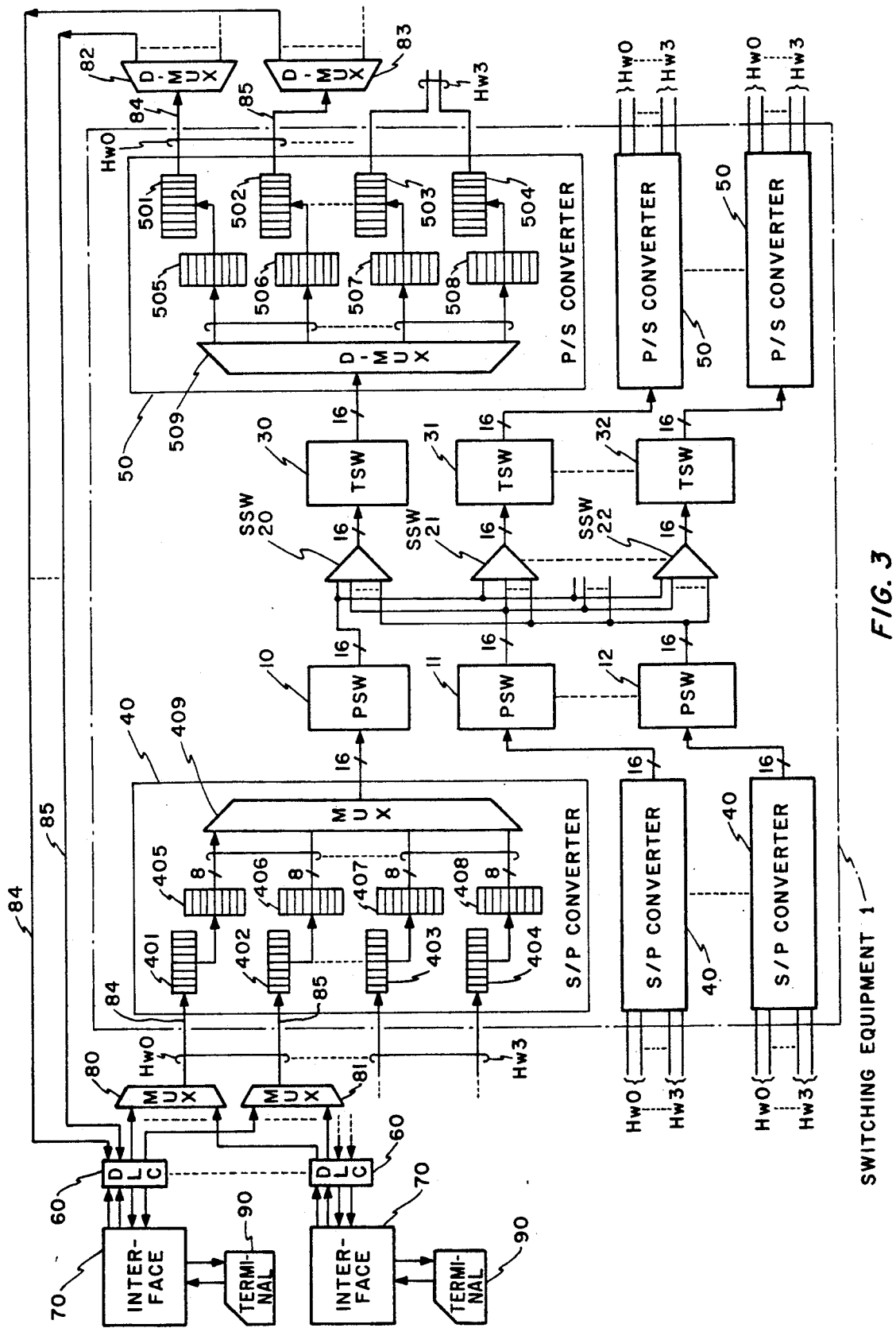
FIG. 3 is a block diagram illustrating a preferred embodiment of the present invention.

Referring to FIG. 3, a preferred embodiment of the present invention comprises time division switching equipment 1; a plurality of highways HW0 to HW3 accommodated in the switching equipment 1; multiplexers 80 and 81 and demultiplexers 82 and 83 connected to the highways; digital line circuits (DLC's) 60, each accommodated in one of the multiplexers and the demultiplexers; data terminals 90 for wideband service (for instance multiple switching of 64 K b/s×3=192 K b/s); and interface units 70, each connected between a DLC 60 and a terminal 90.

Figure 1:
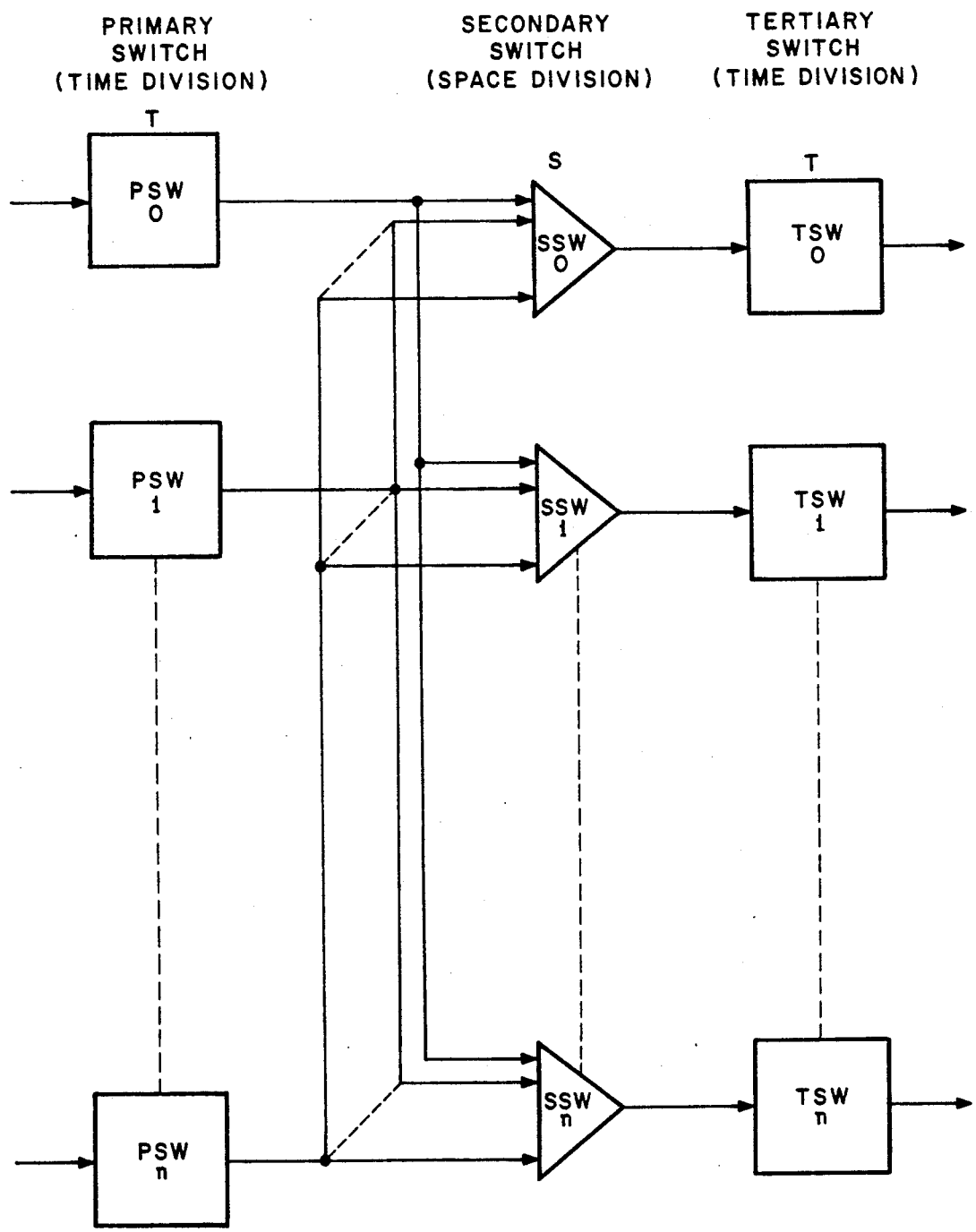
FIG. 1 is a block diagram illustrating a standard three-stage switching configuration used in a time division switching system.
Figure 2:
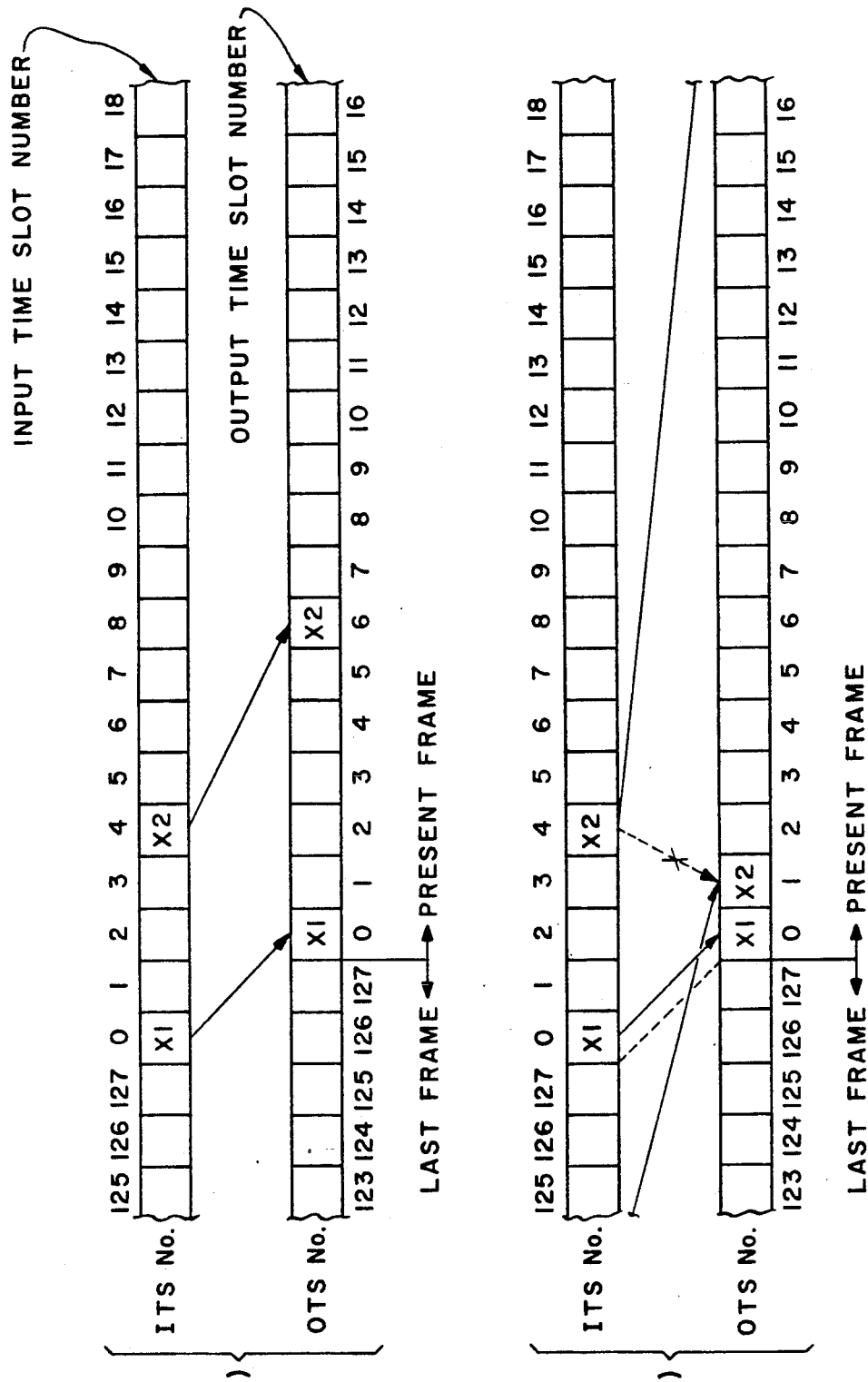
FIG. 2 is a time chart for use in describing the operation of a system according to the prior art.

The switching equipment 1 has a plurality of primary switches (time division switches) (PSW's) 10 to 12; a plurality of secondary switches (space division switches) (SSW's) 20 to 22; a plurality of tertiary switches (time division switches) (TSW's) 30 to 32; serial-to-parallel (S/P) converters 40; and parallel-to-serial (P/S) converters 50. This switching equipment 1 achieves time division switching in the same manner as the switching equipment of the prior art illustrated in FIG. 1. Accordingly equipment does not necessarily preserve the correct sequence of multi-element data in a frame at the time of outputting.

To the input of each of the converters 40 is connected one of the four incoming highways HW0 to HW3. Each highway comprises a data line 84 for speech signals (in telephone exchange) or to transmit data (in data exchange), and a control line 85 for controlling data exchanged between terminals or between a terminal and a switching equipment or between switching equipments (a more detailed description will appear in later paragraphs). Meanwhile, the output of each of the converters 50 is connected to one of the four outgoing highways HW0 to HW3.

The incoming transmit data is outputted from each DLC 60 and are entered into the multiplexer 80 to be multiplexed and outputted to the data line 84. Similarly, incoming control data is outputted from each DLC 60 and are entered into the multiplexer 81 to be multiplexed and outputted to the control line 85. Outgoing transmit data and control data from the switching equipment 1 are entered into the demultiplexers 82 and 83, respectively, to be demultiplexed and distributed to the DLC's 60.

Figure 4:
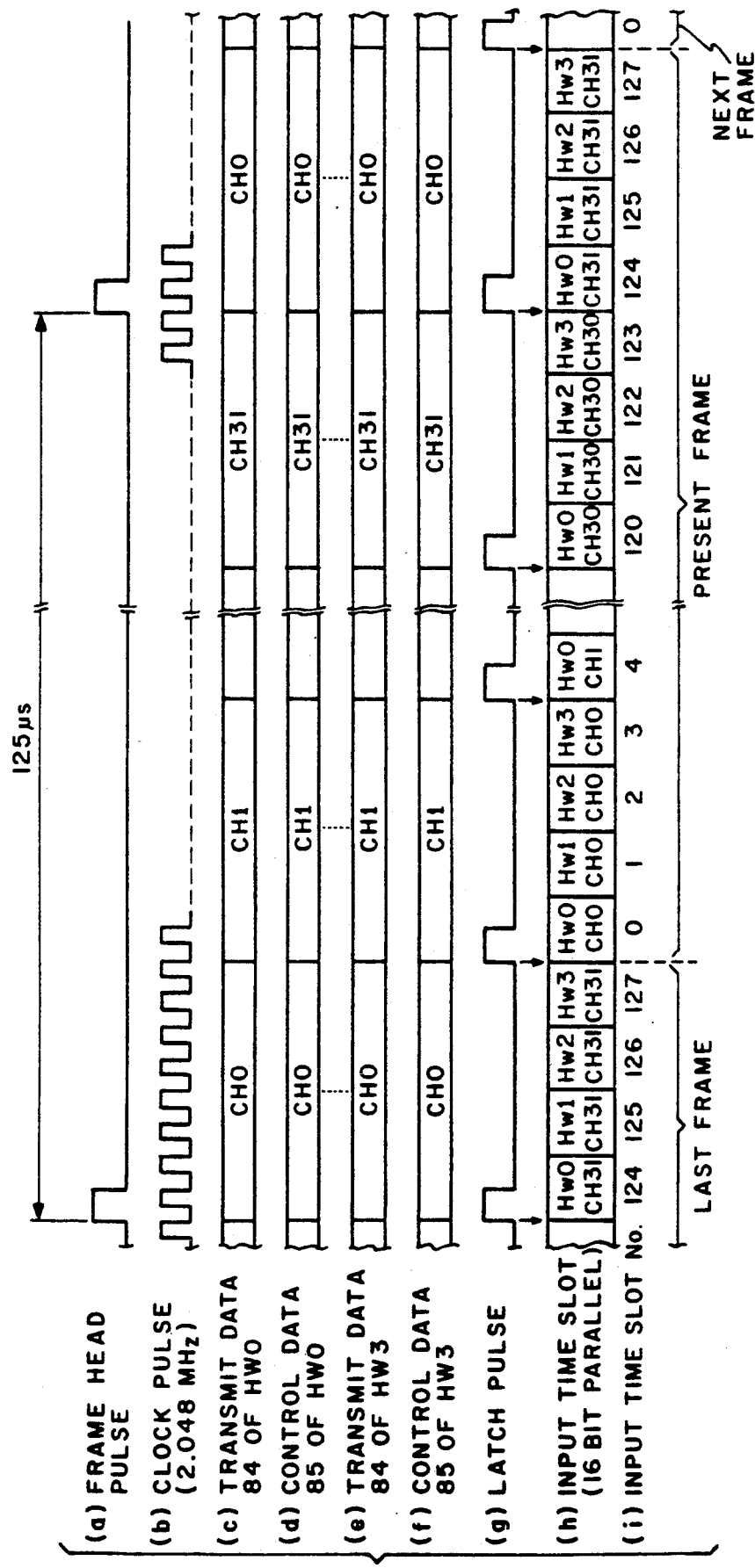
FIG. 4 is a time chart for use in describing the outline of the data transmission method of FIG. 3.

Nest to be described is the outline of data transmission in the system of FIG. 3, with reference to FIG. 4. Transmit data sent from the data terminal 90 on the sending side are entered into the interface units 70 and supplied to the DLC's 60 together with control data. The DLC's 60 perform known control functions which are unique to a switching equipment. The DCL's 60 enter the transmit data and the control data into the multiplexers 80 and 81, respectively. The multiplexers 80 and 81 supply to each of the highways HW0 to HW3 digital data (eight-bit serial data per channel) which are time-division-multiplexed into 32 channels for each frame (125 microseconds) (FIGS. 4 (c) to (f)).

The eight-bit data on each of the channels CH0 to CH31 are sequentially inputted to eight-bit registers 401 to 404 of the S/P converters 40, and stored in eight-bit registers 405 to 408 as eight-bit parallel data in response to a 256 kiloherze latch pulse (FIG. 4(g)). A multiplexer 409 multiplexes the eight-bit parallel data in these registers 405 to 408 into 128 channels per frame, with 16 bits for one highway being made the total data for one channel. Multiplexer 409 inputs them to the PSW's 10 to 12 as data for time slot numbers 0 to 127 (FIGS. 4 (h) and (i)). In the PSW's 10 to 12 take place time slot conversions under the control of a central control unit (not shown), as is well known to those skilled in the art. Then in the SSW's 20 to 22 take place the desired connections to the TSW's 30 to 32, in which are achieved further time slot conversions.

The operations which are opposite the operations illustrated in FIG. 4 are accomplished in the P/S converters 50. Thus, 16-bit parallel data multiplexed into 128 channels are demultiplexed into 32 channels by a demultiplexer 509, converted into 32-channel multiplexed serial data via eight-bit registers 501 to 508, demultiplexed by the demultiplexers 82 and 83, and sent out to the DLC's 60.

The transmit data and the control data sent to each DLC 60 are fed to the corresponding interface unit 70. The transmit data are further sent to the data terminal 90 on the receiving side, the sending being under the control of the control data. Communication between any terminals takes place in the above described procedure.

In this system, 64 K b/s×3 multi-element data, such as referred to above, transmitted from one of the terminals 90 will not necessarily preserve their sequence at the output of the switching equipment 1. Therefore, the system of this preferred embodiment is structured to correct the sequence in the corresponding one of the interface units 70 on the receiving side.

Figure 5:
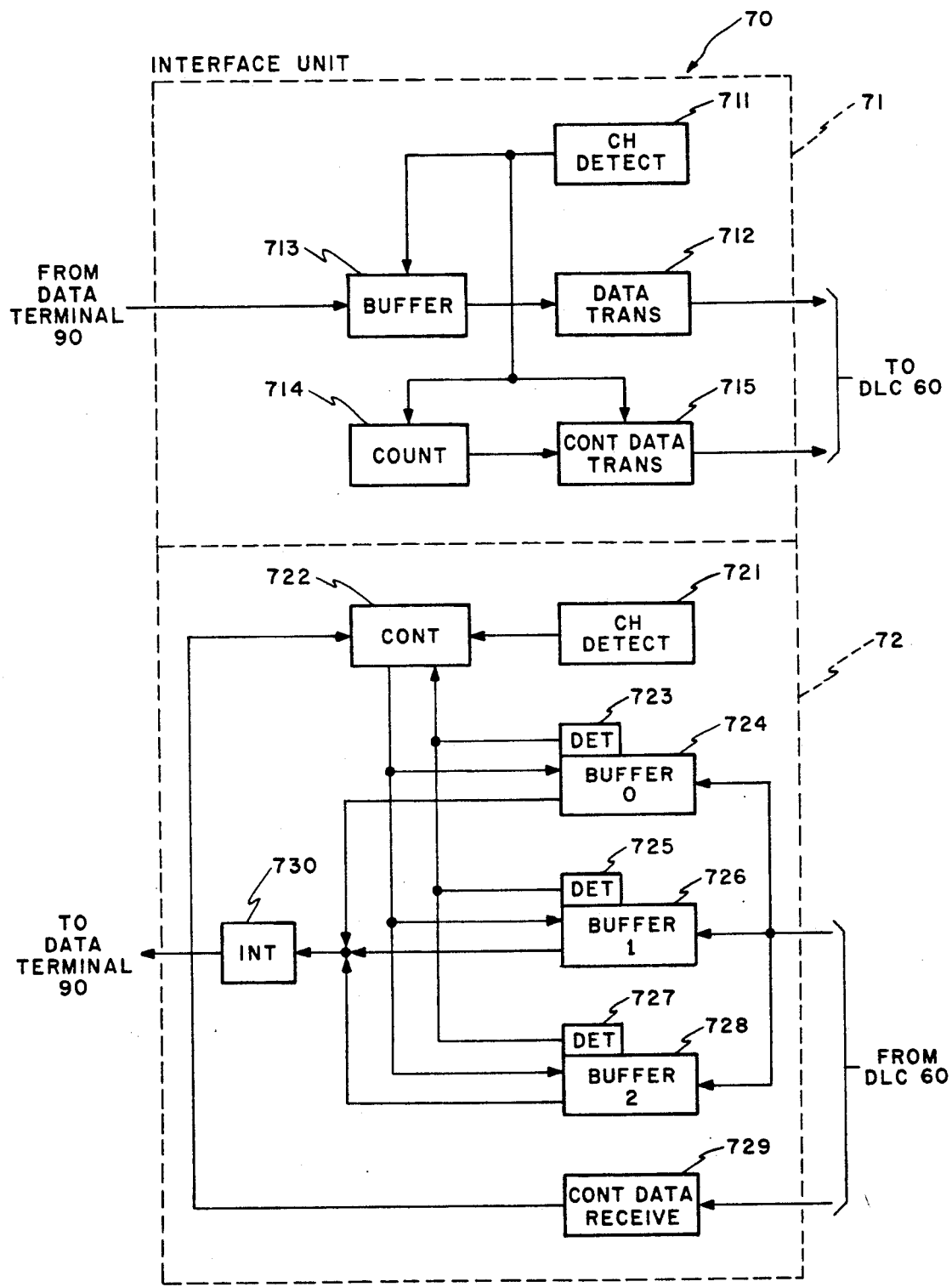
FIG. 5 is a block diagram illustrating further details of FIG. 3.

Details of this interface unit 70 will now be described with reference to FIG. 5. The interface unit 70 consists of a data transmitting section 71 and a data receiving section 72. The transmitting section 71 is provided with a buffer memory 713 for receiving and storing data to be transmitted from the terminal 90; a channel detecting circuit 711 distinguishes the channel assigned to this unit for use in transmission and transmitting data for one channel by a frame head pulse and a clock pulse (both supplied from the switching equipment 1) for use in transmission, a data transmitting circuit 712 for sending the eight-bit data to the DLC 60 for one channel in response to data entered in the buffer 713 a ternary counter 714 counts up by one every time the transmit frame proceeds by one; and a control data transmitting circuit 715 for sending the count of the counter 714, simultaneously with the transmit data, to the DLC 60 as two-bit data (hereinafter called "sequence information") within the control data (eight bits).

The data receiving section 72 has a channel detecting circuit 721 for distinguishing, by a frame head pulse and a clock pulse for use in reception, the channel assigned to this unit for use in reception; a data reception controller 722; three buffer memories 724, 726 and 728 for storing frame by frame, the data sent from the DLC 60; detecting circuits 723, 725 and 727 correspond to the buffers 724, 726 and 728, for detecting, and making known to the controller 722, the storage of all the data in the buffers; a control data receiving circuit 729 extracts, and makes known to the controller 722, the above mentioned sequence information, the sequence information out of the control data which is synchronized with the receive data; and an interface circuit 730 for sending the outputs of the buffers 724, 726 and 728 to the terminal 90. Each of the buffers 724, 726 and 728 has areas for at least 8 bits×3 areas=24 bits so that all the multi-element data for a frame can be stored.

The controller 722 controls the writing into each buffer in accordance with the outputs of the detecting circuit 721 and the receiving circuit 729. Thus, controller 722 rotationally changes the single buffer which stores the receive data on the basis of the sequence information that has been received. More details will be given in later paragraphs. The controller 722 also controls the reading out of each buffer in accordance with the outputs of the detecting circuits 723, 725 and 727. Thus, when all the multi-element data in one transmit frame are stored into one buffer, one of the detecting circuits 723, 725 and 727 corresponding to the buffer makes the storage known to the controller 722, which in response sends the data in the buffer to the terminal 90 via the circuit 730.

Figure 6A:
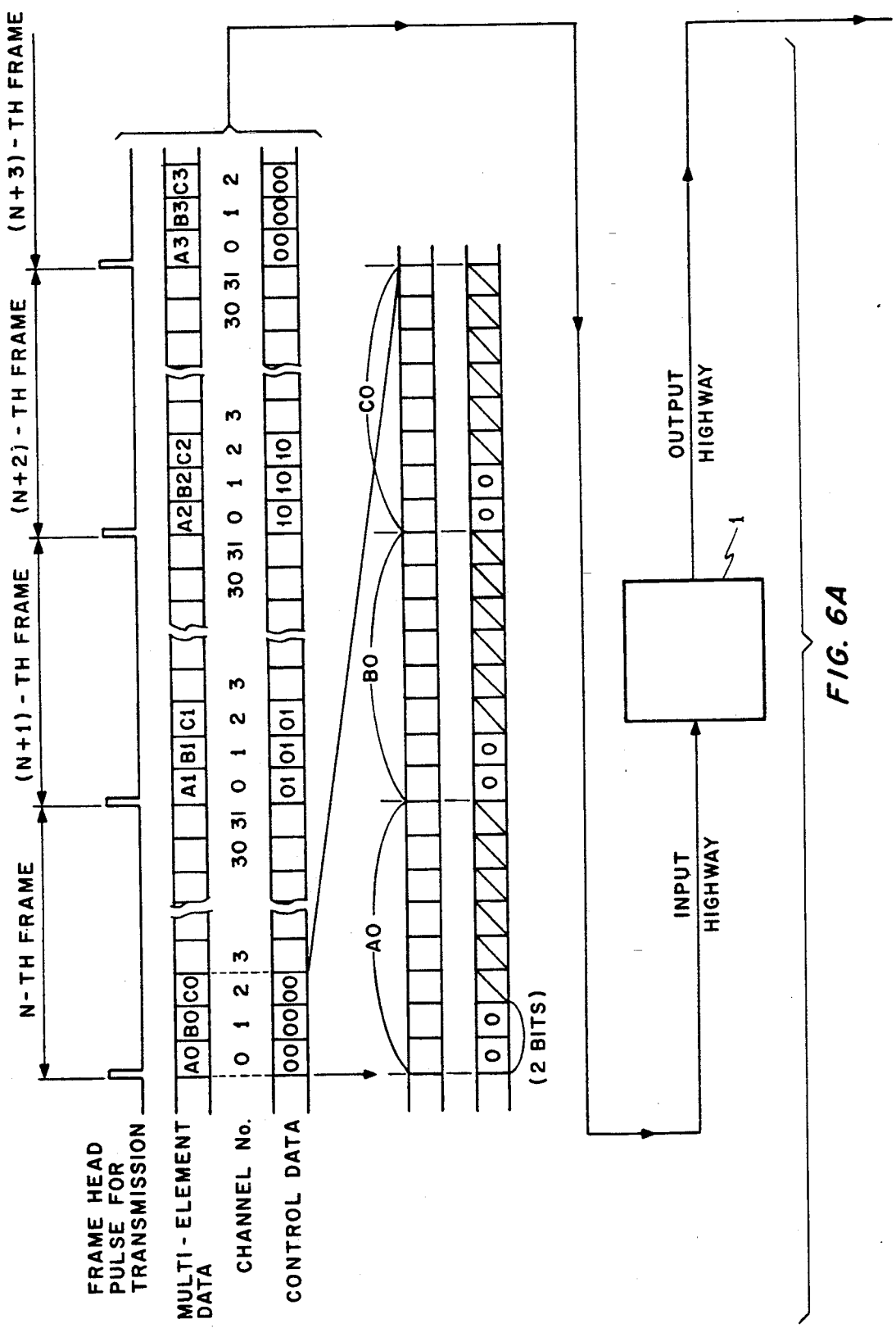
Figure 6:
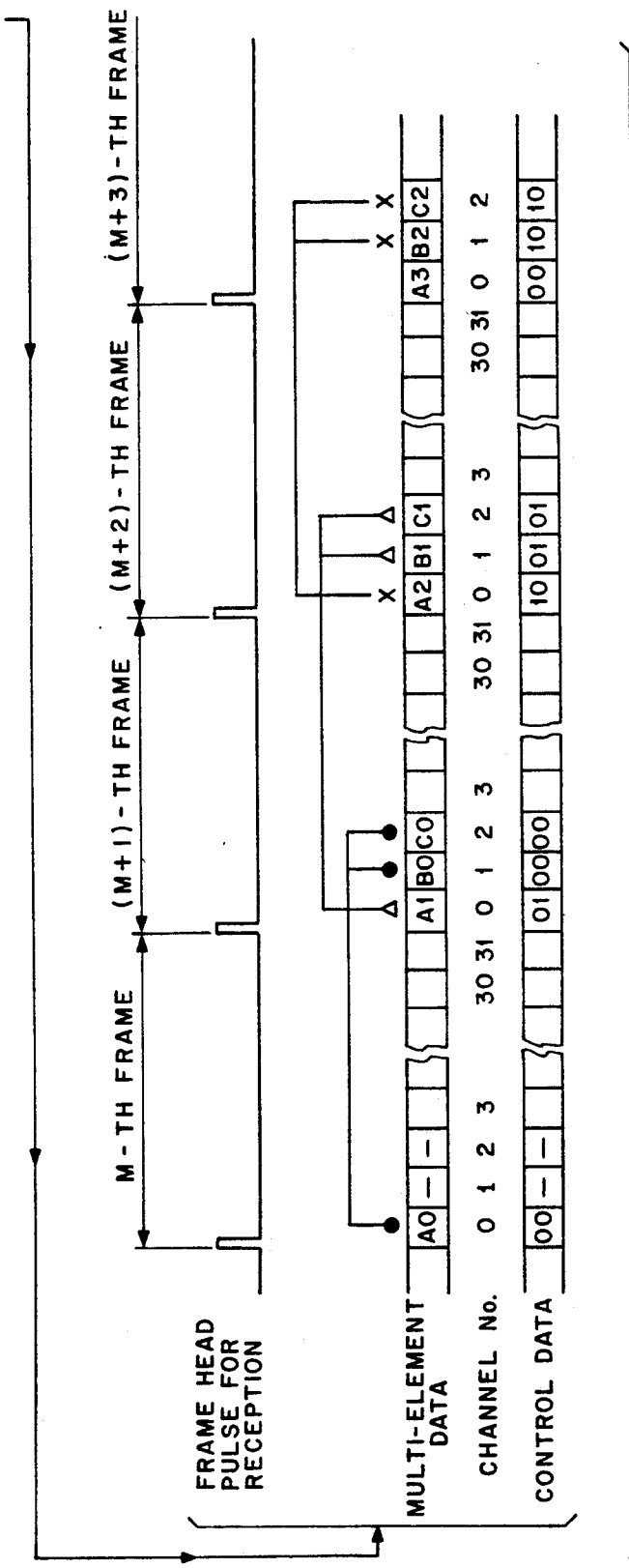
Figure 6:
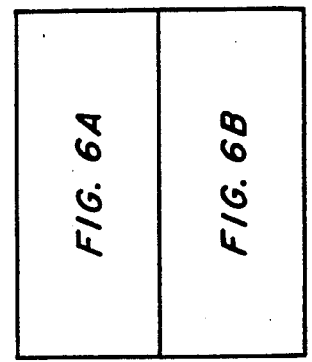

Next, with reference to FIGS. 3 and 5 to 7, the operation of the present invention will be described with a specific example being cited. Now suppose that one of the terminals 90 has started transmitting multi-element data A, B and C from the N-th frame on (FIG. 6A). At this time, the terminal 90 first sends to the buffer memory 713 of the interface 70 data for at least one frame (24 bits). The circuit 711 detects the channels on which to transmit data (channels CH0, CH1 and CH2). Data are taken out of the buffer 713 for one channel at a time and transmitted by the circuit 712.

At this time, the sequence information counted by the counter 714 is sent out in synchronism with the transmit data via the circuit 715. Thus, "00" is used as sequence information for the three data A0, B0 and C0 of the N-th frame, which is the transmission starting frame. In the next (N+1)-th frame, "01" is sent, as a result of counting up by one correspondingly to data A1, B1 and C1. In the still next (N+2)-th frame, "10" is sent further counting up by one correspondingly to data A2, B2 and C2. In the (N+3)-th frame, the count of the counter 714 returns again to the starting count, "00" (FIG. 6A).

Suppose that multi-element data is sent in this manner through two time division switches (a PSW and a TSW) in the switching equipment 1. They take time slots within the switching equipment 1 in a manner which will follow the sequence shown in FIG. 6. Thus the multi-element data A0, B0 and C0 transmitted in the N-th frame are received over two frames, the M-th and the (M+1)-th. The control data are also received in exactly the same sequence as the multi-element data. Incidentally, because of the character of the switching equipment, the sequence among A, B and C within a frame never changes. Thus, both in transmission and reception, data A are always on the first channel.

Now will be described the operation that takes place in the interface unit 70 on the receiving side when reception begins from the M-th frame. Upon detection of channels CH0 to CH2 allocated to this interface 70 for use in reception, the channel detecting circuit 721 notifies the controller 722 of the detection. At this time and in accordance with the sequence information made known from the circuit 729 simultaneously with the data reception, the controller 722, determines which area of which buffer the received data should be stored into, and controls the writing accordingly.

Figure 7:
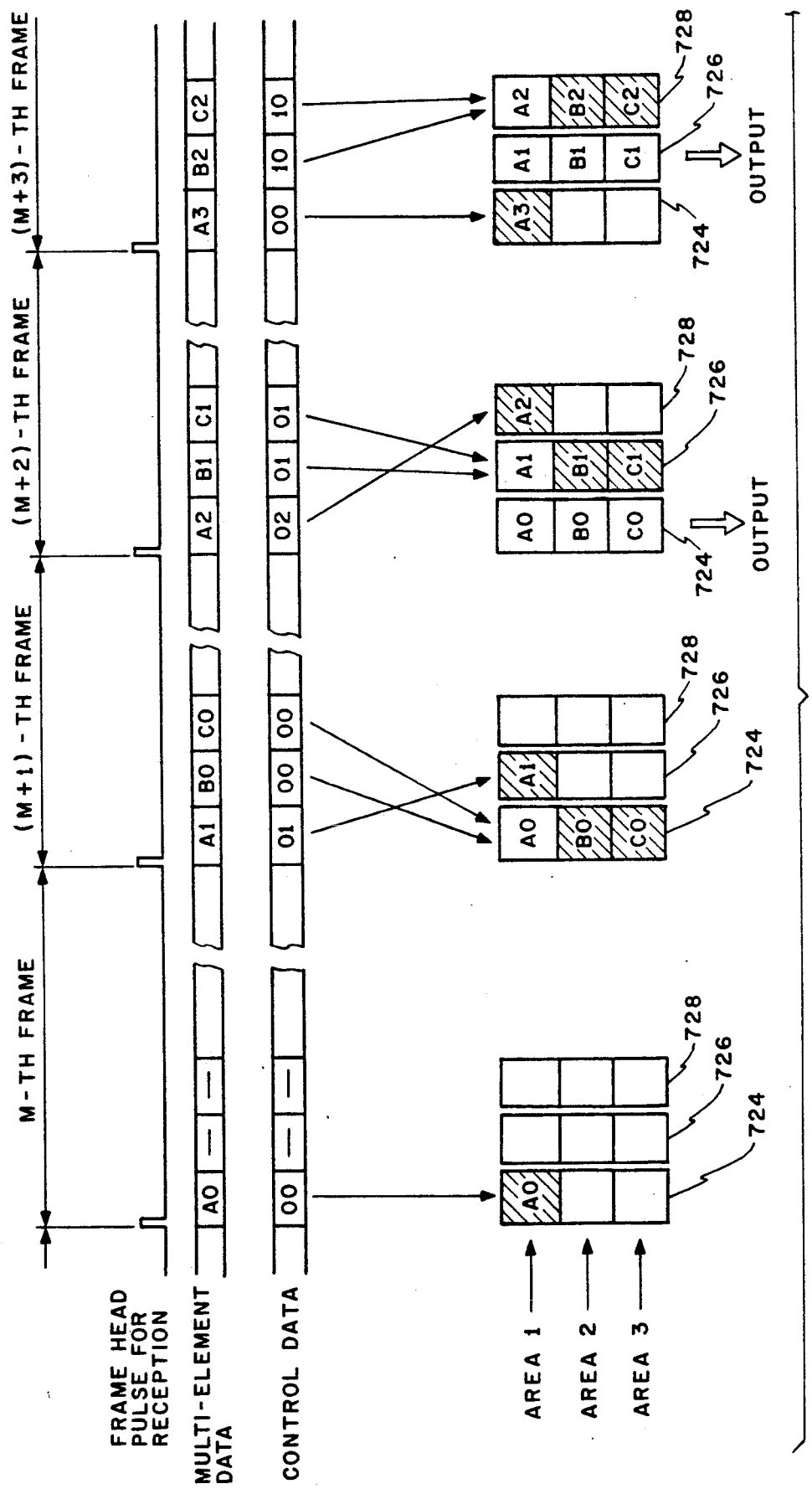

To go into further detail, the buffers 724, 726 and 728 correspond to the sequence information "00", "01" and "10", respectively. The first, second and third receive channels in a frame respectively correspond to the first to third areas, AREA 1, AREA 2 and AREA 3, of each buffer. Then, as shown in FIG. 7, the data A0 received on No. 0 channel in the M-th frame is stored into AREA 1 of the buffer 724. On NOS. 1 and 2 channels of the M-th frame, where neither data nor sequence information is received, nothing is written. Then in the (M+1)-th frame, the receive data A1 is stored into AREA 1 of the buffer 726. Meanwhile, the data B0 and C0 are stored into AREA 2 and AREA 3, respectively, of the buffer 724, because the sequence information "00" indicates that they belong to the frame preceding that of the data A1. Then in the (M+2)-th frame, the data A2 is stored into AREA 1 of the buffer 728, and the data B1 and C1 are stored into AREA 2 and AREA 3, respectively, of the buffer 726. In this (M+2)-th frame, the buffer 724 takes on a state in which, as illustrated, the three multi-element data A0 to C0 transmitted in the N-th frame are stored in their correct sequence.

The detecting circuit 723 (FIG. 5) detects that all the areas of the buffer 724 have been occupied, and notifies the controller 722 of their occupation. In response, the controller 722 gives an outputting instruction to the buffer 724. A series of multi-element data A0 to C0 are sent to the terminal 90 via the circuit 730. After that, the controller 722 clears the buffer 724 to ready it for reception in the (M+3)-th frame. The same procedure is repeated thereafter. In the (M+3)-th frame are outputted the data A1 to C1 from the buffer 726. Thus, the correct sequence of the multi-element data is preserved by rotationally using the three buffers. Wide-band switching is made possible without having to use any specific time switches in the switching equipment 1.

This particular preferred embodiment of the invention, described a use of three buffers for data reception in the interface 70 and further that two out of the eight bits of control data would be utilized for the sequence information which would make possible to differentiate the use of the three buffers. As is evident from FIG. 7, however, at least three buffers would suffice for data reception, of which two are used for writing and one is for outputting in the same frame. The number of bits of sequence information would vary with the number of buffers. If, for instance, three bits are used for sequence information, the range of the usable number of buffers will be up to $2^3 = 8$.

Further, it is sufficient for each data receiving buffer to have a number of areas (three in the embodiment) that can accommodate all the multi-element data in a frame.

Further, once a call is established in the switching equipment 1, the internal time slot which is then selected will remain unchanged until the end of the call. Therefore, the sequence of multi-element data in the receive data is fixed until the completion of the communication. By virtue of this character, once the sequence information is monitored on a few frames, its pattern is recognized, at the start of data transmission and reception. The controller 722 can control the data receiving buffers thereafter without requiring the sending side to transmit the sequence information for every frame.

What is claimed is:

1. A time division switching system for switching K-bit (K is a positive integer) transmit data and L-bit (L is a positive integer which is equal to or greater than 2) control data, the switching system comprising:

transmitting means on a sending side for transmitting sequence information when K-bit $\times$ P (P is a positive integer, and $2 \leq P \leq 0$) multi-element data constituting a sequence of data occupies P channels in a single frame are to be switched, said sequence information correcting the sequence of said multi-element data as part of said control data in synchronism with said multi-element data, all of said transmit data being sent to a time division multiplexed input highway having 0 channels (0 is a positive integer which is equal to or greater than 2) of time division switching equipment; and the switching system having a receiving side, R (R is a positive integer which is equal to or greater than 3) numbers of buffer memories on said receiving side for receiving and storing said multi-element data received from a time division multiplexed output highway having 0 channels of said switching equipment, accumulating means for sequentially accumulating said multi-element data in said buffer memories depending on said sequence information which has been received, and sequence correcting means for correcting and outputting the sequence of said multi-element data stored in said buffer memories when all of said multielement data sent within the same frame from the sending side have been accumulated in one of said buffer memories on said receiving side;

said sequence information being set in correspondence to each of said buffer memories, said multi-element data being accumulated in the buffer memory of said accumulating means as indicated by said sequence information which is received together with said multi-element data; and said transmitting means includes an R-nary counter which counts up in response to every transmit frame, said sequence information comprising data encoded into the output of the counter.

2. A time division switching system as claimed in claim 1, wherein said accumulating means rotationally uses said R buffer memories in accumulating said multi-element data as they are received.

* * * * *